(12) United States Patent
Zakoji et al.

(10) Patent No.: US 7,806,531 B2
(45) Date of Patent: Oct. 5, 2010

(54) PROJECTOR

(75) Inventors: Makoto Zakoji, Shiojiri (JP); Takeshi Seto, Chofu (JP); Akira Egawa, Shiojiri (JP); Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 758 days.

(21) Appl. No.: 11/583,782

(22) Filed: Oct. 20, 2006

(65) Prior Publication Data

US 2007/0091276 A1    Apr. 26, 2007

(30) Foreign Application Priority Data

Oct. 24, 2005   (JP)   ............................ 2005-308286

(51) Int. Cl.
*G03B 21/16*   (2006.01)
(52) U.S. Cl. .............................. 353/52; 353/53; 353/54; 353/55; 353/56; 353/57; 353/58; 353/59; 353/60; 353/61; 353/119; 361/679.53; 361/679.54; 361/679.55; 361/688; 361/689; 349/161; 165/80.4; 165/86; 165/104.33

(58) Field of Classification Search ................... 353/52, 353/53, 54, 55, 56, 57, 58, 59, 60, 61, 119, 353/122; 165/80.4, 86, 104.33; 361/679.53, 361/679.54, 679.55, 688, 689; 349/161
See application file for complete search history.

(56) References Cited

U.S. PATENT DOCUMENTS

| 5,032,021 | A  | * | 7/1991 | Kanatani et al. | ............... 353/54 |
| 5,532,711 | A  | * | 7/1996 | Harris | .......................... 345/55 |
| 6,623,144 | B2 | * | 9/2003 | Bornhorst | .................... 362/318 |
| 2006/0197916 | A1 | * | 9/2006 | Hashimoto | .................... 353/52 |

FOREIGN PATENT DOCUMENTS

JP    A 2004-126255    4/2004

* cited by examiner

*Primary Examiner*—Georgia Y Epps
*Assistant Examiner*—Sultan Chowdhury
(74) *Attorney, Agent, or Firm*—Oliff & Berridge, PLC

(57) ABSTRACT

A projector includes: a casing having a surface; a cooling medium flowpath provided inside the casing, through which a cooling medium is allowed to flow; and a radiator in which a part of the cooling medium flowpath is arranged, the radiator being deployable by rotating with respect to the casing, and adapted to be accommodated in the casing and along the surface of the casing.

27 Claims, 15 Drawing Sheets

PROJECTOR

CROSS-REFERENCE TO RELATED APPLICATION

This application claims priority from Japanese Patent Application No. 2005-308286, filed Oct. 24, 2005, the contents of which are incorporated herein by reference.

BACKGROUND

1. Technical Field

The present invention relates to a projector.

2. Related Art

Recently in the field of projectors, in addition to projectors for commercial use during conferences, presentations, or the like, projectors for household use are also becoming popular.

To accommodate these changing applications, small, thin and highly portable projectors are developed.

Liquid crystal light valves used in projectors of this type are much smaller than conventional ones.

Since a bright image is required for display, the light source luminance is increased.

Against this background, since high-luminance light is concentrated in a small liquid crystal light valve, there are problems in that heat-generation density is increased and reliability is reduced.

A mechanism for cooling these optical components is therefore important.

While a cooling fan (air cooling system) is conventionally used as a cooling mechanism in a projector, in view of problems such as noise, vibration, and cooling capability, a liquid cooling system is recently considered.

As for example disclosed in Japanese Unexamined Patent Application, First Publication No. 2004-126255, there is proposed a liquid cooling system including heat-radiating plates having an internal cooling medium flowpath, and the heat-radiating plates are separated from the casing of the projector. Thereby, heat can be radiated from both faces of the heat-radiating plates.

However, in the above described patent document, although the radiator is arranged at a position separated from the casing above or below the projector main unit, the heat-radiation performance is still insufficient.

In particular, when the projector is miniaturized, the heat-radiation performance is insufficient; whereas increasing the size of the heat-radiating plate in order to enhance the cooling performance will prevent the miniaturization of device and obstruct its portability.

SUMMARY

An advantage of some aspects of the invention is to provide a projector that has sufficient heat-radiating performance, is small and thin, and has excellent portability.

A first aspect of the invention provides a projector, including: a casing having a surface; a cooling medium flowpath provided inside the casing, through which a cooling medium is allowed to flow; and a radiator in which a part of the cooling medium flowpath is arranged, the radiator being deployable by rotating with respect to the casing, and adapted to be accommodated along the surface of the casing.

According to the projector of first aspect of the invention, a part of the cooling medium flowpath provided inside the casing is arranged in the radiator, and the cooling medium, whose temperature has been increased by cooling the constituent components inside the casing, is cooled again in the radiator.

Since the radiator can be contracted along the surface of the casing, the device (projector) can be miniaturized and thinner when not in use, and has excellent portability.

Since the radiator can rotate and deploy with respect to the casing, the entire radiator can be exposed to outside air by deploying the radiator so that it protrudes outside the casing during use, thereby it is possible to increase the heat radiation rate.

It is preferable that the projector of the first aspect of the invention further include: a first fin provided in the radiator.

According to this configuration, heat transmitted to the radiator can be radiated through the first fin, it is possible to increase the heat radiation rate.

It is preferable that the projector of the first aspect of the invention further include: a plurality of the first fins provided in the radiator; and openings provided between mutually adjacent first fins, and penetrating through the radiator, wherein a part of the cooling medium flowpath be exposed in the openings.

According to this configuration, since the cooling medium flowpath is exposed at the portion at which outside air flows in the opening and blows through the radiator, the cooling medium flowing in the cooling medium flowpath can be sufficiently cooled by the outside air.

It is preferable that the projector of the first aspect of the invention further include: a plurality of second fins provided in the casing, wherein the second fins of the casing be arranged between the mutually adjacent first fins while the radiator be accommodated along the surface of the casing.

In other words, when the radiator is accommodated along the surface of the casing, the second fins of the casing and the first fins of the radiator preferably fit together.

According to this configuration, the second fins of the casing can increase the heat radiation performance of the casing itself.

Moreover, when the radiator is accommodated along the surface of the casing, since the second fins of the casing are arranged between the mutually adjacent first fins of the radiator and fit with them, it is possible to realize a projector which can be accommodated compactly without being obstructed by interference of both fins.

A second aspect of the invention provides a projector, including: a casing; a cooling medium flowpath provided inside the casing, through which a cooling medium is flowed; and a radiator in which a part of the cooling medium flowpath is arranged, the radiator being deployable by drawing out of the casing, and adapted to be accommodated in the casing.

According to the projector of the second aspect of the invention, a part of the cooling medium flowpath provided inside the casing is arranged in the radiator, and the cooling medium, whose temperature has been increased by cooling the constituent components inside the casing, is cooled again in the radiator.

Since the radiator can be accommodated in an internal space of the casing, even if the radiator has a certain volume and takes up considerable space, when not in use, the projector can be miniaturized and thinner, and has excellent portability.

Since the radiator can be deployed by drawing it out of the casing, when in use, the radiator can be exposed to outside air and the heat radiation rate can be increased.

It is preferable that, in the projector of the second aspect of the invention, the casing internally include an optical path space, and the radiator be accommodated in the optical path space.

Spaces already exist between various optical components inside the projector, such as a space that becomes an optical path between two lenses.

Therefore, if the radiator is accommodated using this optical path space, there is no need to provide a separate space for accommodating it, and the device can be miniaturized without obstruction.

It is preferable that, in the projector of the second aspect of the invention, the casing include an opening, and a part of the radiator closes the opening in the casing when the radiator is drawn out of the casing.

In a configuration in which the radiator is drawn out of the casing, an opening for inserting and removing the radiator exists in the casing.

If this opening is left open during use, dust, dirt, or the like will infiltrate, which is undesirable.

If the radiator is constructed so that a part thereof closes the opening of the casing, infiltration of dust, dirt, or the like can be prevented.

It is preferable that, in the projector of the second aspect of the invention, the casing includes an opening, the projector further including a closing member closing the opening of the casing when the radiator is drawn out of the casing.

According to this configuration, when the radiator is drawn out of the casing, the closing member closes the opening of the casing, thereby infiltration of dust, dirt, or the like can be prevented.

It is preferable that, in the projector of the second aspect of the invention, the closing member close the opening in the casing in conjunction with an operation of drawing the radiator out of the casing.

When the radiator is drawn, while the user can close the opening by manipulating the closing member, it is more convenient if the closing member closes the opening in conjunction with the operation of drawing the radiator out of the casing, since this eliminates the troublesome task of manipulation by the user and avoids a problem of his forgetting to close the opening.

A third aspect of the invention provides a projector, including: a casing; a cooling medium flowpath provided inside the casing, through which a cooling medium is flowed; and a radiator in which a part of the cooling medium flowpath is arranged, wherein the part of the cooling medium flowpath is expandable and contractible, the part of the cooling medium flowpath is accommodated inside the casing when contracted, and the part of the cooling medium flowpath is deployed out of the casing when expanded.

According to the projector of the third aspect of the invention, a part of the cooling medium flowpath provided inside the casing is arranged in the radiator, and the cooling medium, whose temperature has been increased by cooling the constituent components inside the casing, is cooled again in the radiator.

Since the cooling medium flowpath which constitutes a part of the radiator can be expanded and contracted, when it is contracted, this cooling medium flowpath can be accommodated inside the casing, thereby the device can be miniaturized and thinner when not in use, and has excellent portability.

When a part of the cooling medium flowpath is expanded, the cooling medium flowpath can be deployed out of the casing, thereby the entire radiator can be exposed to outside air when in use, and it is possible to increase the heat radiation rate.

It is preferable that the projector of the third aspect of the invention further include: a plurality of the cooling medium flowpaths.

While one cooling medium flowpath which deploys outside the device during use is sufficient, if the cooling medium flowpaths are provided, the flow rate of the cooling medium can be increased and the heat radiation rate can be further increased.

It is preferable that the projector of the third aspect of the invention further include: a heat-radiating member provided in the cooling medium flowpath, and constituting a part of the casing when the cooling medium flowpath is contracted.

According to this configuration, heat-radiation is achieved not only by the cooling medium flowpath but also by the action of the heat-radiating member, it is possible to further increase the heat radiation rate.

Since the heat-radiating member constitutes a part of the casing when the cooling medium flowpath is contracted, the radiator can be compactly accommodated without protruding out of the casing.

It is preferable that, in the projector of the third aspect of the invention, the cooling medium flowpath include a first cooling medium flowpath in which the cooling medium flows away from the casing and a second cooling medium flowpath in which the cooling medium flows toward the casing, and the first cooling medium flowpath and the second cooling medium flowpath be arranged in one portion of the casing.

According to this configuration, even if the cooling medium flowpath is deployed during use, the device does not occupy a large installation area and can be installed compactly.

It is preferable that, in the projector of the third aspect of the invention, the casing include a first portion and a second portion which is different to the first portion, the cooling medium flowpath include a first cooling medium flowpath in which the cooling medium flows away from the casing and a second cooling medium flowpath in which the cooling medium flows toward the casing, the first cooling medium flowpath be arranged in the first portion of the casing, and the second cooling medium flowpath be arranged in the second portion of the casing.

According to this configuration, the heat radiation area can be increased, and the heat radiation rate can be further increased.

It is preferable that the above described projector of the invention further include: a deployment detector detecting whether the radiator is deployed; and a power control unit prohibiting supply of power to the projector when the deployment detector detects that the radiator is not deployed.

According to this configuration, the deployment detector detects whether the radiator is deployed. When the deployment detector detects that the radiator is not deployed, the power controller prevents injection of power to the projector. Therefore, it is possible to prevent trouble such as overheating of the projector when the light source is ignited by injection of power while the radiator is not deployed.

It is preferable that the above described projector of the invention further include: a deployment detector detecting whether the radiator is deployed; and a warning section issuing a warning indicating that the radiator is not deployed when the deployment detector detects that the radiator is not deployed.

According to this configuration, the deployment detector detects whether the radiator is deployed. When the deployment detector detects that the radiator is not deployed, the warning section issues a warning indicating that the radiator is not deployed to the user. This enables the user to take appropriate measures such as re-deploying the radiator.

Therefore, it is possible to prevent overheating of the projector during continuous use after the user forgets to deploy the radiator.

It is preferable that the above described projector of the invention further include: a light source avenged inside the casing; a deployment detector detecting whether the radiator is deployed; and an illuminance controller reducing the illuminance of light at the light source when the deployment detector detects that the radiator is not deployed.

According to this configuration, the deployment detector detects whether the radiator is deployed. When the deployment detector detects that the radiator is not deployed, the illuminance controller reduces the illuminance of light at the light source. It is possible to prevent overheating of the projector during continuous use when there is a large amount of heat-radiation at high illuminance.

It is preferable that the above described projector of the invention further include: a radiator deploying section automatically deploying the radiator in conjunction with supply of power to the projector.

According to this configuration, since the radiator deploying section automatically deploys the radiator in conjunction with injection of power to the projector, it is possible to prevent from being used when the radiator is undeployed, without a special operation being executed by the user.

It is preferable that the above described projector of the invention further include: a power input section exposed when the radiator is deployed.

According to this configuration, since the user cannot operate the power input section without first deploying the radiator, the projector can be prevented from overheating due to using the radiator in its undeployed state.

DESCRIPTION OF EXEMPLARY EMBODIMENTS

First Embodiment

A first embodiment of the invention will be explained with reference to FIGS. 1 to 5.

Figure 1:
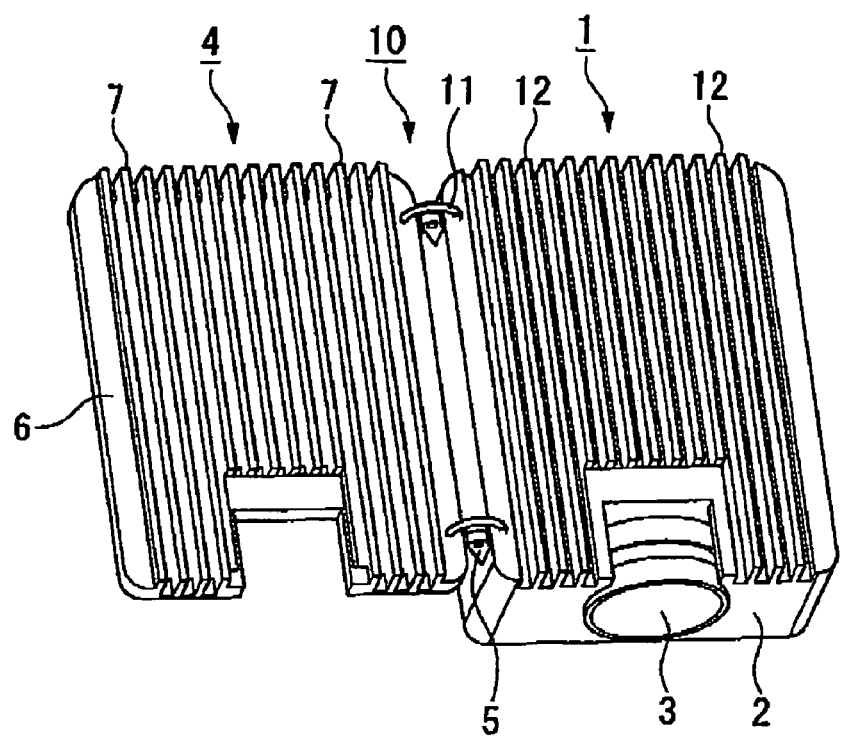
FIG. 1 is a perspective view of a deployed state of a radiator of a projector according to a first embodiment of the invention.
Figure 2:
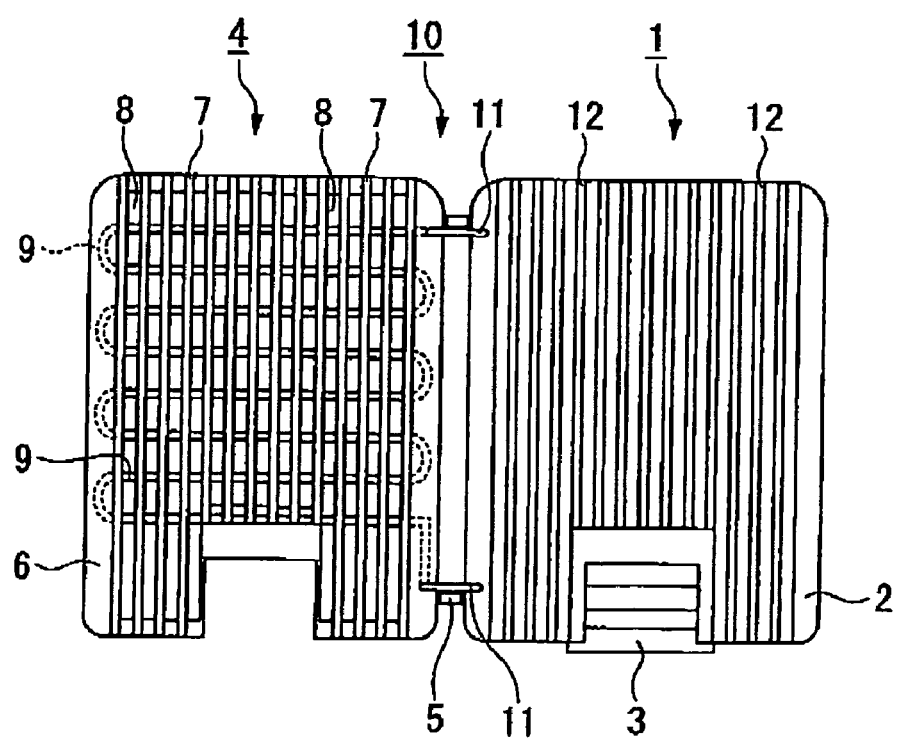
FIG. 2 is a plan view of the deployed state of a radiator of a projector according to the first embodiment of the invention.
Figure 3:
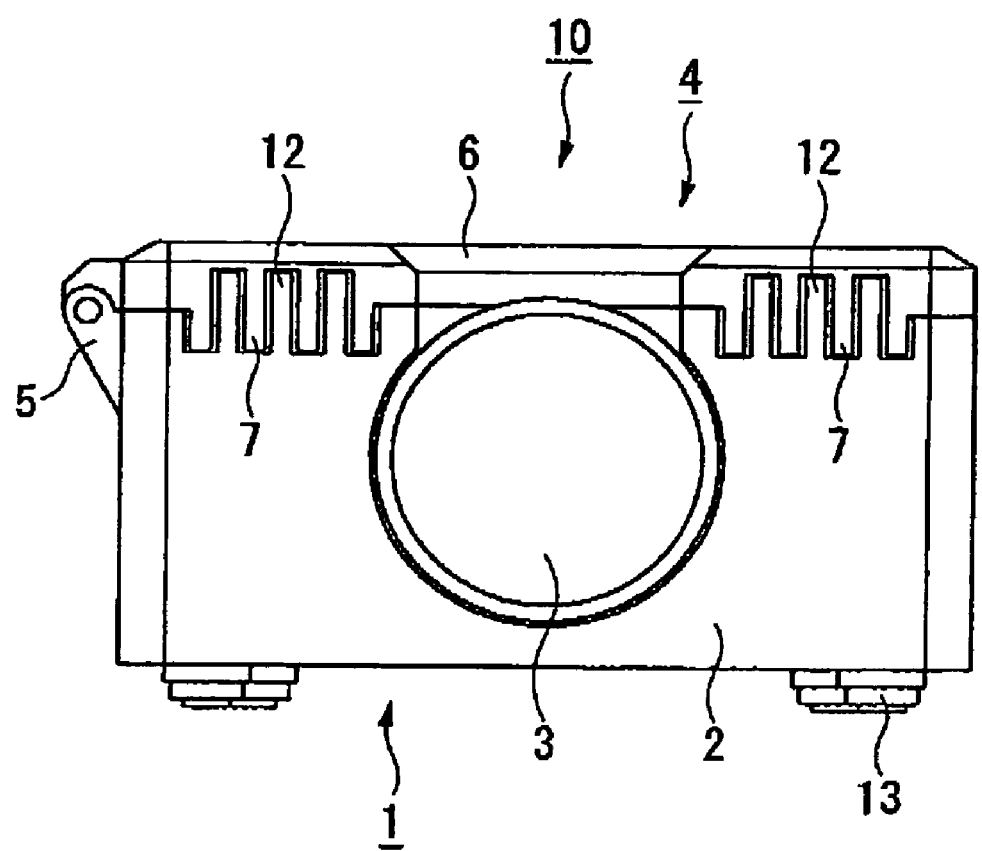
FIG. 3 is a front view of an accommodated state of the radiator of the projector of the first embodiment.
Figure 4:
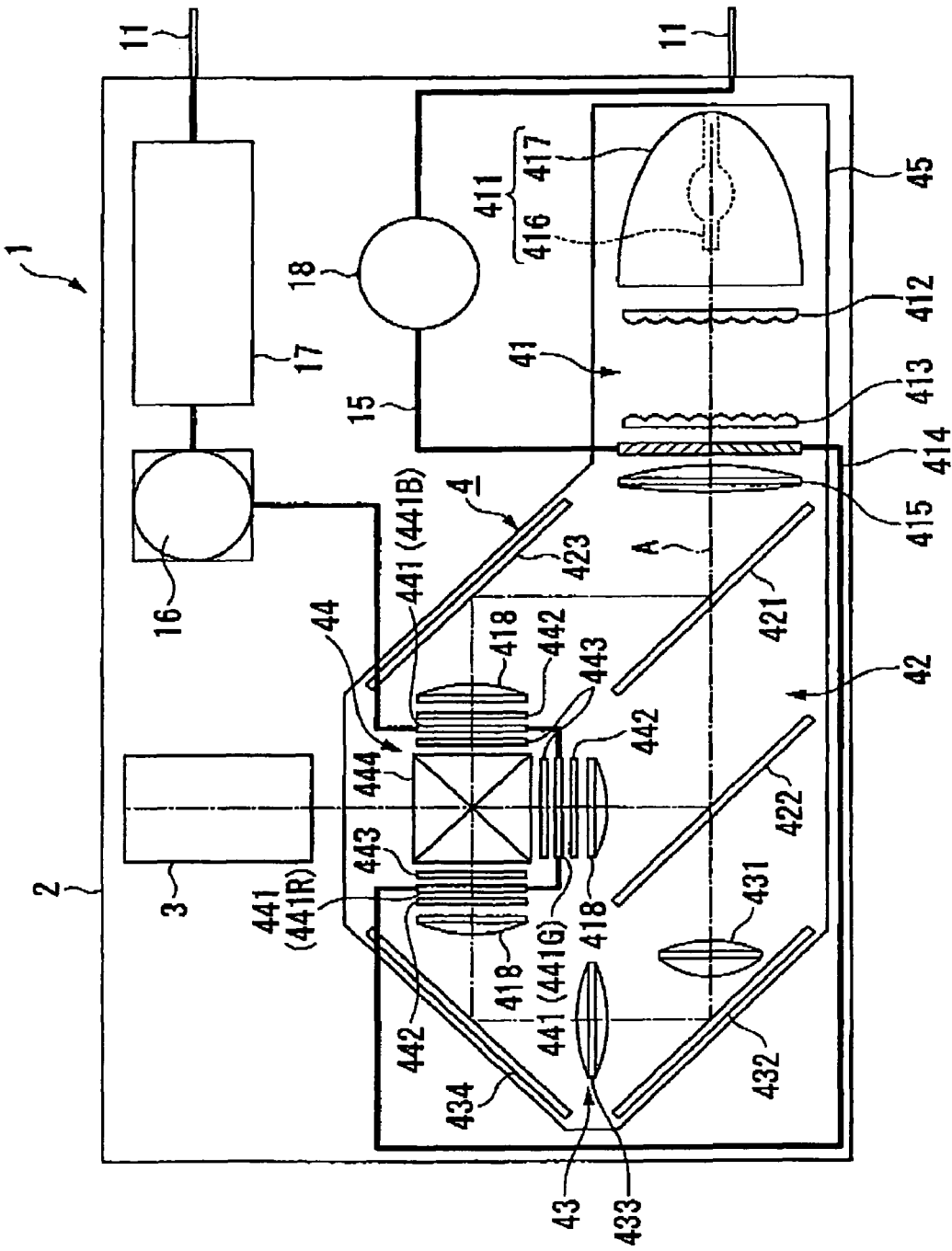
FIG. 4 is a schematic diagram of a projector.
Figure 5:
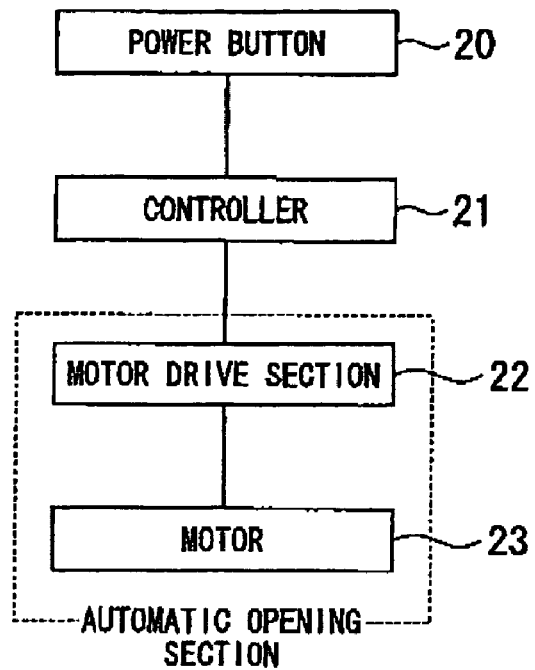
FIG. 5 is a block diagram relating to accommodating and deploying a radiator.

FIG. 1 is a perspective view of a deployed state of a radiator of a projector according to a first embodiment of the invention, FIG. 2 is a plan view of the same, FIG. 3 is a front view of an accommodated state of the radiator of the same projector, FIG. 4 is a basic internal configuration diagram of a projector, FIG. 5 is a block diagram relating to accommodating and deploying a radiator.

In the following drawings, dimensions are differed to facilitate recognition of the constituent parts.

As shown in FIGS. 1 and 2, a projector 10 of this embodiment includes a projector main unit 1 having a casing 2 in which various components are accommodated, a projection lens 3 exposed at a front face, and a deployable radiator 4 which is provided on a top face of the projector main unit 1 and can rotate with respect to the projector main unit 1.

Hinge 5 joins the projector main unit 1 to the radiator 4, and is arranged along sides extending in the long direction of the projector main unit 1.

The radiator 4 can rotate around the hinge 5, and deploys by a predetermined angle with the top face of the projector main unit 1 as a reference.

While in FIGS. 1 and 2, the radiator 4 is deployed 180° from the top face of the projector main unit 1, this angle need not be limited to 180°, it is necessary only that the radiator 4 can be held in a deployed state at any given angle.

The radiator 4 includes a plurality of heat-radiating fins 7 (first fins) provided on one face of a plate member 6.

Regions between adjacent heat-radiating fins 7 (portions indicated by reference numeral 8 in FIG. 2) form openings 8 penetrating through the plate thickness direction of the radiator 4.

A cooling pipe 9 (cooling medium flowpath) described below is arranged in a zigzag formation inside the radiator 4.

The folding portions of the cooling pipe 9 (portions represented by broken lines) are embedded in the plate member 6, whereas the portions indicated by solid lines are exposed at the openings 8 between the heat-radiating fins 7.

Flexible tubes 11 form part of a cooling pipe from the projector main unit 1 to the radiator 4, and join a cooling pipe of the projector main unit 1 to the cooling pipe 9 of the radiator 4.

A plurality of heat-radiating fins 12 (second fins) are also provided on the top face of the casing 2 of the projector main unit 1.

As shown in FIG. 3, the heat-radiating fins 12 are arranged between the heat-radiating fins 7 with the radiator 4 accommodated along the top face of the casing 2.

In other words, the heat-radiating fins 12 of the casing 2 and the heat-radiating fins 7 of the radiator 4 fit each other.

Legs 13 are provided on the bottom face of the casing 2 of the projector main unit 1.

As shown in FIG. 4, the casing 2 of the projector main unit 1 accommodates a light source 411, an integrator illumination optical system 41, a color-separation optical system 42, reflecting mirrors 423, 432, 434, a polarization conversion element 414, a superposition lens 415, a relay optical system 43, liquid crystal light valves 441R, 441G, and 441B, a cross dichroic prism 444, a projection lens 3, etc.

The light source 411 includes a lamp 416, such as a high-pressure mercury lamp or a metal halide lamp, and a reflector 417 reflecting the light from the lamp.

The integrator illumination optical system 41 for uniformizing the illumination distribution of light emitted from the light source is provided in the emission area of the light source 411, and includes two fly-eye lens arrays 412 and 413.

A dichroic mirror 421 forming the color-separation optical system 42 transmits red light and green light contained in white light from the light source 411, while reflecting blue light.

A dichroic minor 422 transmits red light and blue light, while reflecting green light.

Consequently, blue light reflected by the dichroic mirror 421 is reflected by the reflecting mirrors 423, and is incident on the liquid crystal light valve for blue light 441B.

Green light transmitted through the dichroic mirror 421 is reflected by the dichroic mirror 422, and is incident on the liquid crystal light valve for green light 441G.

Red light transmitted through the dichroic mirror 421 is also transmitted through the dichroic mirror 422.

The relay optical system 43 is provided in order to prevent light loss of the red light on a long optical path, and includes an incident lens 431 and a relay lens 433.

Red light is incident on the liquid crystal light valve for green light 441R through the relay optical system 43.

Each of liquid crystal light valve 441R, 441G, and 441B includes a field lens 418, an incident side polarizing plate 442, a liquid crystal panel 441, and an outgoing side polarizing plate 443. These are arranged from incident side to the cross dichroic prism 444 in sequence.

Lights of three colon modulated by the liquid crystal light valves are incident on the cross dichroic prism 444.

This cross dichroic prism 444 is formed by attaching together four right-angled prisms, a dielectric multilayered film reflecting red light and a dielectric multilayered film reflecting blue light are arranged in a X-shape at the interfaces.

These dielectric multilayered films synthesize the lights of three colors, obtaining light that expresses a color image.

The synthesized light is projected onto a screen by the projection lens 3 constituting a projection optical system, and the image is displayed in enlargement.

A cooling medium such as water flows along a cooling pipe 15 for cooling the polarization conversion element 414 and liquid crystal panels 441 for lights of each color, the cooling pipe 15 is provided inside the casing 2 of the projector main unit 1.

A pump 16, a radiator 17, a reserve tank 18, or the like, are arranged midway along the cooling pipe 15.

The pump 16 forcibly pumps the cooling medium along the cooling pipe 15, the radiator 17 assists heat-radiation of the cooling medium, mid the reserve tank 18 is a container accommodating the cooling medium.

The cooling medium flows along the cooling pipe 15 from the reserve tank 18, passes sequentially through the polarization conversion element 414, the liquid crystal light valve for red light 441R, the liquid crystal light valve for green light 441G, and the liquid crystal light valve for blue light 441B, and cools these optical components.

The temperature of the cooling medium rises due to heat-exchange with these optical components. After this cooling medium is conveyed to the radiator 17, the cooling medium is conveyed via the flexible tube 11 from the casing 2 of the projector main unit 1 to the cooling pipe 9 in the radiator 4.

As shown in FIG. 2, the cooling medium is conveyed from one of the flexible tubes 11 to the cooling pipe 9 in the radiator 4, and zigzags through the radiator 4 before being returned from the other flexible tube 11 to the reserve tank 18 of the projector main unit 1.

Therefore, the high-temperature cooling medium is momentarily cooled by the radiator 17 of the projector main unit 1, and is then sufficiently cooled by the outside air flowing through the openings 8 of the radiator 4 as it flows through the radiator 4, before returning to the projector main unit 1.

The cooling pipe 15 of the projector main unit 1 and the cooling pipe 9 of the radiator 4 can be formed from a non-flexible material such as metal.

However, in order to rotate the radiator 4, the portions in which the hinge 5 joins the projector main unit 1 to the radiator 4 must include the flexible tubes 11.

The projector main unit 1 of this embodiment includes a radiator deploying section which automatically deploys the radiator 4 when power is injected to the projector main unit 1.

Specifically, the projector main unit 1 of this embodiment includes a motor for rotating the radiator 4 and a motor drive section for driving the motor (not shown in FIGS. 1 to 4).

The motor is provided inside the projector main unit 1, and deploys the radiator 4 by transmitting a motive force via a driving transmission mechanism such as a cogwheel.

Alternatively, the motor can be directly incorporated inside the hinge 5.

As shown in FIG. 5, when a user injects power by pressing a power button 20 (power input section), a power injection signal is input to a controller 21.

The controller 21 outputs a drive signal to a motor drive section 22, and the motor drive section 22 drives a motor 23.

Consequently, the radiator 4 automatically deploys in conjunction with power injection.

In the projector main unit 1 of this embodiment, since the radiator 4 can be accommodated along the top face of the casing 2, the device can be miniaturized and thinner when not in use, and has excellent portability.

When the radiator 4 is accommodated along the surface of the casing 2, the heat-radiating fins 12 or the casing 2 fit with the heat-radiating fins 7 of the radiator 4. Therefore their heat-radiation areas can be increased while maintaining an increased heat radiation rates. In addition, the fins 7 and 12 do not interfere and obstruct accommodation, it is possible to realize the projector to be accommodated compactly.

Since the radiator 4 is rotatable and deployable with respect to the casing 2, the overall radiator 4 can be exposed to outside air by deploying the radiator 4 such that the radiator 4 protrudes to the outside of the casing 2 during use. It is possible to increase the heat radiation rate of the radiator 4.

Moreover, since the beat-radiating fins 7 and 12 are provided on the radiator 4 and the projector main unit 1, the radiator 4 can be rotated more than 90° until it protrudes completely toward side direction of the projector main unit 1, this prevents the fins on both sides from being affected by the heat they radiate, and it is possible to sufficiently increase the heat radiation rate.

Furthermore, since the regions between adjacent heat-radiating fins 7 of the radiator 4 form the openings 8, the outside air flows through the openings 8 to blow through the radiator 4.

Since the cooling pipe 9 is exposed at these portions, the cooling medium flowing in the cooling pipe 9 can be sufficiently cooled by the outside air.

Furthermore, since the radiator 4 is configured so as to deploy automatically when power is injected to the projector main unit 1, the projector man unit 1 can be prevented from overheating when the radiator 4 is used in an undeployed state, without a special operation by the user.

While this embodiment describes the configuration by which the radiator 4 automatically deploys in conjunction with power injection as the configuration for preventing overheating when the radiator 4 is in an undeployed state, other the configurations will be explained below.

First Modified Example

The configuration can include a deployment detector detecting whether the radiator is deployed, and an illuminance controller reducing the illuminance of light from the projector main unit when the deployment detector detects that the radiator is not deployed.

The deployment detector can be configured by providing a photo-sensor, a potentiometer, or the like in the radiator and at the hinge portions.

The illuminance controller can include, for example, a lamp drive section controlling the light quantity of the lamp by controlling the current supplied to the lamp.

Figure 6:
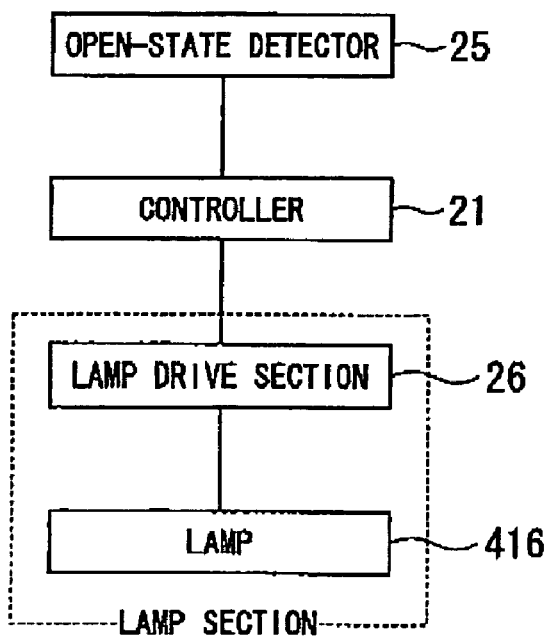
FIG. 6 is a block diagram relating to accommodating and deploying a radiator in a modified example according to the first embodiment.

As shown in FIG. 6, a deployment detector 25 detects the state of the radiator 4, when the deployment detector 25 detects that the radiator 4 is not deployed, a detection signal indicating that fact input to the controller 21.

The controller 21 outputs a drive signal indicating that the light quantity should be reduced to a lamp drive section 26, and the lamp drive section drives a lamp 416.

Consequently, when the radiator 4 is not deployed, the illuminance of light in the projector main unit 1 decreases and less heat is generated.

As a result, it is possible to prevent trouble such as overheating of the projector main unit 1 during continued use at high illuminance when the radiator 4 is not deployed.

Second Modified Example

The configuration can include a deployment detector detecting whether the radiator has deployed, and a power control unit making it impossible to inject power to the projector main unit when the deployment detector detects that the radiator is not deployed.

As described in the first modified example, the deployment detector can be configured by providing a photo-sensor, a potentiometer, or the like in the radiator and at the hinge portions.

The power controller need only include a power drive section controlling power.

Figure 7:
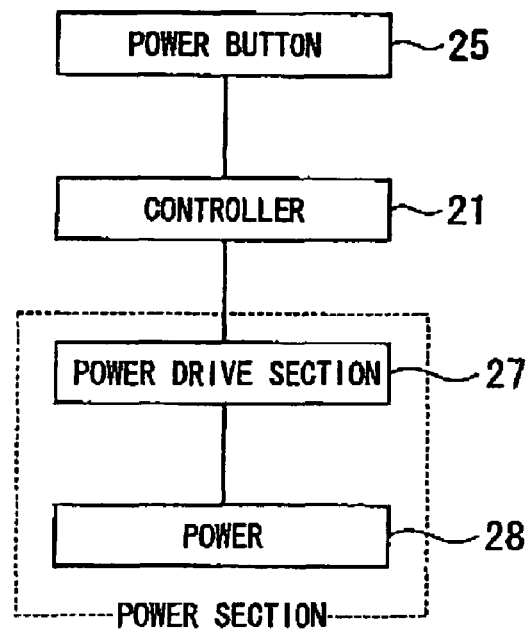
FIG. 7 is a block diagram relating to accommodating and deploying a radiator in a second modified example.

As shown in FIG. 7, the deployment detector 25 detects the state of the radiator 4, and when the deployment detector 25 detects that the radiator 4 is not deployed, a detection signal indicating that fact input to the controller 21.

The controller 21 outputs a drive signal to a power drive section 27, and the power drive section 27 controls power 28 such that it is not injected even if a power button is pressed.

As a result, it is possible to prevent trouble such as overheating of the projector main unit 1 when the light source is ignited by injecting the power 28 while the radiator 4 is not deployed.

Third Modified Example

The configuration can include a deployment detector detecting whether the radiator has deployed, and a warning section issuing a warning to the user that the radiator is not deployed, when the deployment detector detects that the radiator is not deployed.

As described in the first and second modified examples, the deployment detector can be configured by providing a photo-sensor, a potentiometer, or the like in the radiator and at the hinge portions.

The warning section can be one that makes a visual report to the user, such as a display section, or one that makes an audio report to the user, such as a warning bell and an audio sound; a drive section for driving them is also provided.

Figure 8:
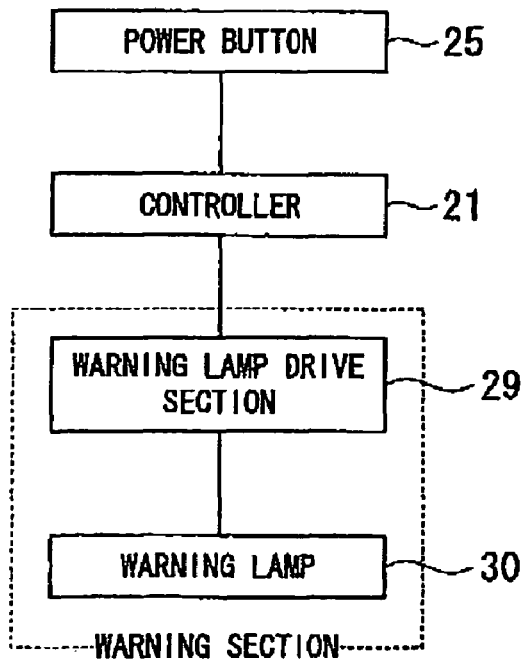
FIG. 8 is a block diagram relating to accommodating and deploying a radiator in a third modified example.

As shown for example in FIG. 8, in the case in which a warning lamp is used, the deployment detector 25 detects the state of the radiator 4, when the deployment detector 25 detects that the radiator 4 is not deployed, a detection signal indicating that fact input to the controller 21.

The controller 21 outputs a drive signal to a warning lamp drive section 29. The warning lamp drive section 29 drives and ignites a warning lamp 30.

This enables the user to ascertain that the radiator 4 is not deployed.

As a result, the user can take appropriate measures such as re-deploying the radiator 4, and it is possible to prevent trouble such as overheating of the projector main unit 1 during continuous use when the user forgets to deploy the radiator 4.

Fourth Modified Example

A power button can be provided at a position at which the power button can be operated by the user when the radiator is deployed.

Figure 9:
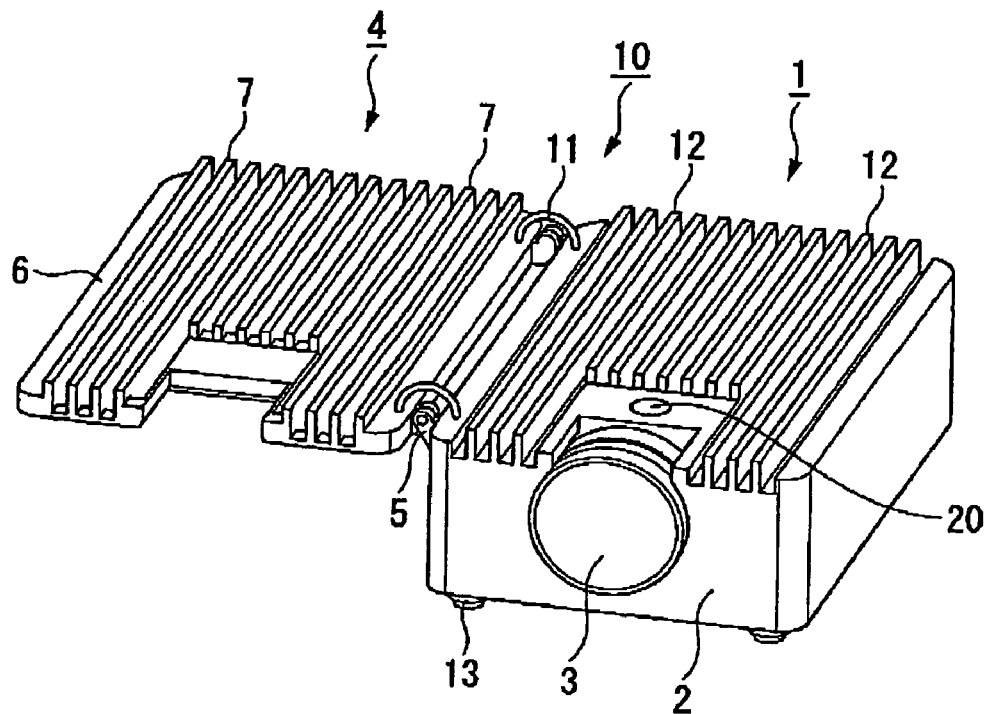
FIG. 9 is a perspective view of a deployed state of a radiator of a projector in a fourth modified example.

FIG. 9 is a perspective view of a deployed state of a radiator of a radiator according to a fourth modified example.

In FIG. 9, constituent parts common to those of FIG. 1 are represented by the same reference numerals and are not repetitiously explained.

As shown in FIG. 9, a power button 20 is provided on the top face of the projector main unit 1. The power button 20 is exposed when the radiator 4 is in a deployed state.

In this example, the user deploys the radiator 4 manually.

In this configuration, since the user cannot operate the power button 20 without first deploying the radiator 4, the projector main unit 1 can be prevented from overheating due to using the radiator 4 when it is undeployed.

Second Embodiment

A second embodiment of the invention will be explained with reference to FIGS. 10 to 12.

Figure 10:
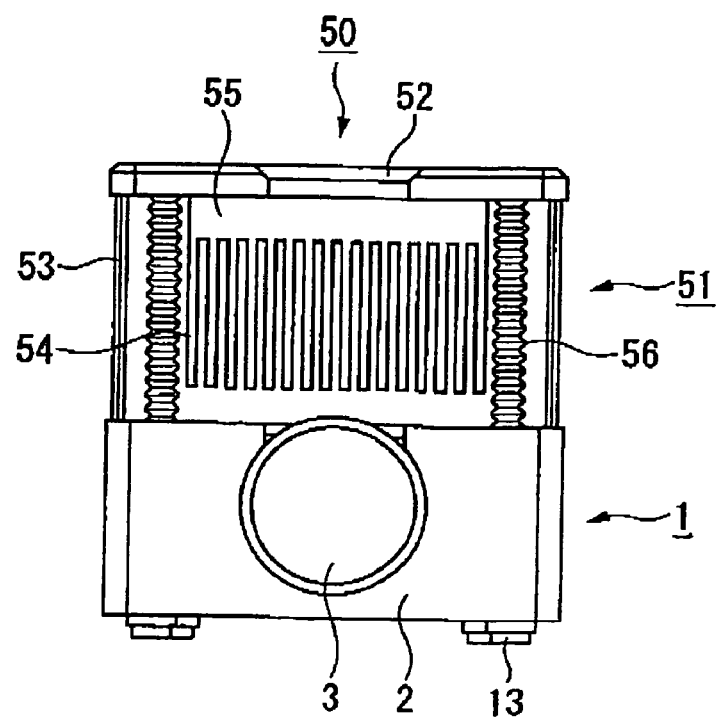
FIG. 10 is a front view of a deployed state of a radiator of a projector according to a second embodiment of the invention.
Figure 11:
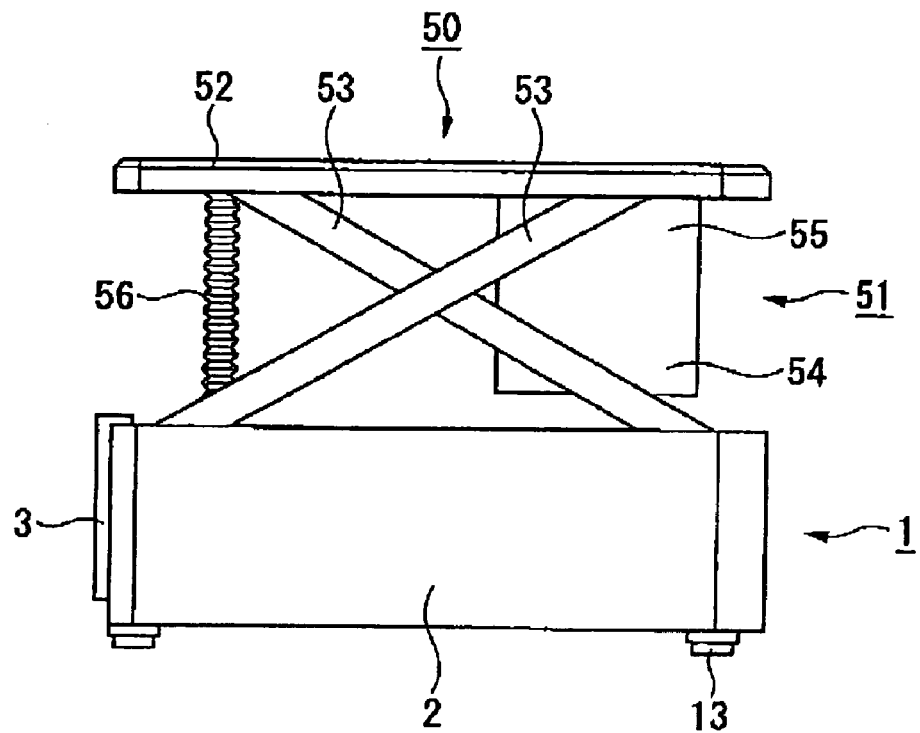
FIG. 11 is a side view of the deployed state of a radiator of a projector according to the second embodiment of the invention.
Figure 12:
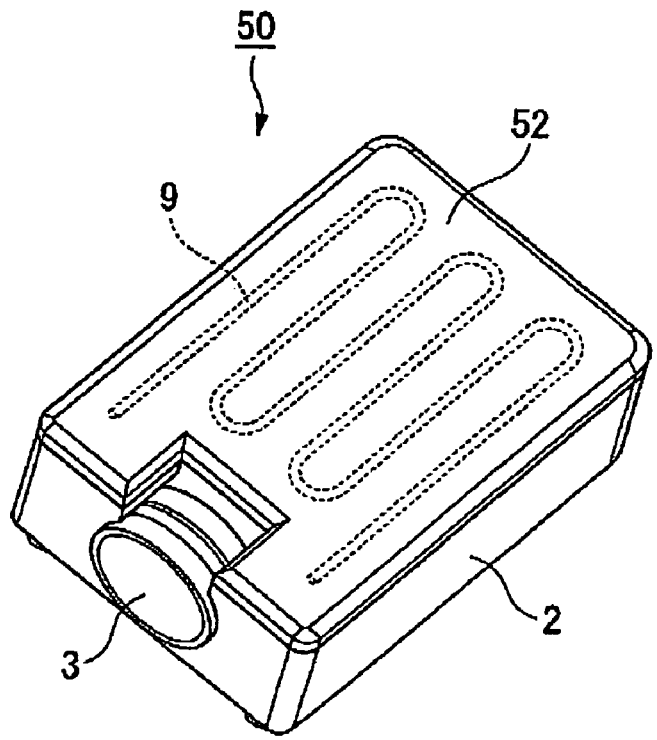
FIG. 12 is a perspective view of an accommodated state of the radiator of the projector of the second embodiment.

FIG. 10 is a front view of a deployed state of a radiator of a projector according to a second embodiment of the invention, FIG. 11 is a side view of the same, and FIG. 12 is a perspective view of a deployed state of a radiator of the same projector.

In FIGS. 10 to 12, constituent parts that are common to those of FIGS. 1 to 3 are represented by the same reference numerals and are not repetitiously explained.

As shown in FIGS. 10 to 12, a projector 50 of this embodiment includes a projector main unit 1 having a casing 2 and a projection lens 3, and a radiator 51 that is accommodated in an internal space of the projector main unit 1 and can be deployed by drawing it out of the projector main unit 1.

A top plate 52 of the casing 2 of the projector main unit 1 can be made to elevate and lower by using slide rails 53, and a heat sink 55 having a plurality of heat-radiating fins 54 is provided on a bottom face of the top plate 52.

In this embodiment, the heat sink 55 and the top plate 52 of the casing 2 form a radiator 51.

As shown in FIG. 10, the plurality of heat-radiating fins 54 are arranged at predetermined intervals when the projector 50 is viewed from the front, with their tips pointing downwards.

As shown in FIGS. 10 and 11, when the radiator 51 is deployed, the heat-radiating fins 54 are entirely exposed to the outside of the casing 2.

The top-to-bottom dimensions of the heat-radiating fins 54 are less than the top-to-bottom dimensions of the casing 2. As shown in FIG. 12, the heat-radiating fins 54 can be completely accommodated in the internal space of the projector main unit 1.

In this embodiment, the heat sink 55 including the heat-radiating fins 54 is accommodated in a space in the optical path of the projector main unit 1.

As shown for example in FIG. 4, in the projector main unit 1, there are many spaces between the optical components on the optical path, e.g., between the two fly-eye lens arrays 412 and 413, between the dichroic minors 421 and 422, between the dichroic mirror 421 and the reflecting mirror 423, and between the dichroic mirror 422 and the incident lens 431.

Therefore, since the heat sink 55 can be accommodated in these spaces, there is no need to provide a separate space for accommodating the heat sink 55. Furthermore, a miniaturizing of the device is not obstructed.

As described in the first embodiment (FIG. 4), a cooling pipe 15 is provided in the casing 2 of the projector main unit 1, and is arranged along a polarization conversion element 414 and three liquid crystal light valves 441R, 441G, and 441B.

As shown in FIG. 12, a cooling pipe 9 is arranged in a zigzag formation inside the top plate 52.

As shown in FIGS. 10 and 11, accordion-folded flexible tubes 56 form a part of a cooling medium flowpath and are provided between the projector main unit 1 and the top plate 52 so as to join the cooling pipe 15 on the projector main unit 1 side to the cooling pipe 9 of the top plate 52.

The flexible tubes 56 expand and contract as the top plate 52 elevates and lowers.

During use, heat generated on the projector main unit 1 is conveyed to the radiator 51 by feeding a cooling medium into the flexible tubes 56, and radiated from the radiator 51.

In the projector 50 of this embodiment, although the heat sink 55 of the radiator 51 is fairly large and requires space, the fact that the beat sink 55 can be accommodated in the internal space of the casing 2 enables the device to be miniaturized and thinner during use, and gives it excellent portability.

Furthermore, since the flexible tubes 56 is formed the accordion-folded shape, it is possible to easily accommodate the radiator 51.

In particular in this embodiment, since the radiator 51 deploys upwardly, a small installation area is sufficient, even during use.

Furthermore, since the radiator 51 including the large heat sink 55 can be deployed such that it protrudes out of the casing 2, the radiator 51 can be sufficiently exposed to outside air during use, it is possible to increase the heat radiation rate.

Since the tips (bottom ends) of the heat-radiating fins 54 are opened, outside air can flow upwardly and downwardly through the gaps between adjacent heat-radiating fins 54, it is possible to increase the heat radiation rate.

As described in the first embodiment, this embodiment can be configured in various ways such that, when the projector is used while the radiator 51 is an undeployed state, a power control unit prevents injection of power, a warning section issues a warning to the user, or the radiator 51 is automatically deployed in conjunction with power injection by a radiator deploying section, etc.

For example, in a configuration for automatically deploying the radiator 51, a motor is installed inside the projector main unit 1 and deploys the radiator 4 by transmitting a motive force via a driving transmission mechanism such as a cogwheel.

When these configurations are utilized, the projector main unit 1 can be prevented from overheating.

While in this embodiment, the radiator 51 (heat sink 55) is accommodated in the optical path, the radiator 51 can be accommodated outside the optical path if space is available.

If a construction is employed in which the radiator 51 is accommodated outside the optical path, it is possible to adopt the configuration in which the illuminance of the light source is reduced when the projector is used with the radiator 51 in the undeployed state. In a case in which the radiator 51 is accommodated within the optical path, since the radiator 51 shuts the optical path, it is impossible to reduce the illuminance of the light source while the radiator 51 is undeployed.

In a case in which the radiator 51 is drawn out of the casing as this embodiment, an opening for inserting and retracting the radiator 51 is formed in a part of the casing 2 (the top face in this embodiment).

If this opening is left uncovered during use, dust, dirt, or the like will infiltrate, which is undesirable.

Configurations for solving this problem will be explained.

Fifth Modified Example

A part of the radiator can be configured so as to close the opening in the casing when the radiator is drawn to the outside thereof.

Figure 13:
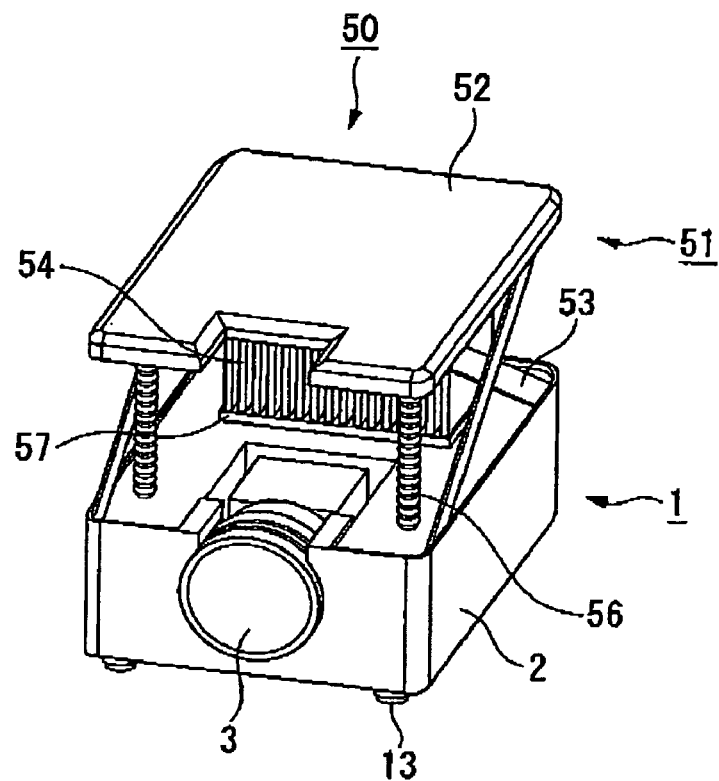
FIG. 13 is a perspective view of a deployed state of a radiator of a projector in a fifth modified example according to the second embodiment.

For example, in FIG. 13, a lid plate 57 is horizontally formed to the tips (bottom ends) of the plurality of heat-radiating fins 54.

In this configuration, the opening in the casing 2 is closed when the heat-radiating fins 54 are drawn out of the casing 2, and prevents infiltration of dust, dirt, and so on.

As the fourth modified example, a power button can be provided at a position on which the user first becomes able to operate the power button when the radiator 51 is drawn out of the casing 2.

Figure 14:
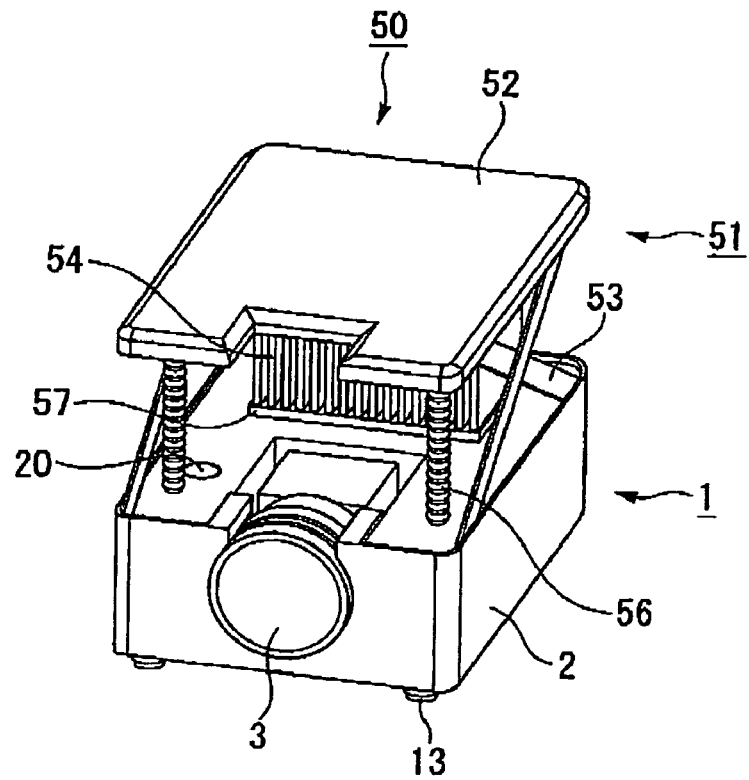
FIG. 14 is a perspective view of another example of the fifth modified example.

As shown for example in FIG. 14, the power button 20 is provided on the top face of the casing 2, which is exposed when the top plate 52 elevates.

In this example, the user deploys the radiator 51 manually.

In this configuration, since the user cannot operate the power button 20 without first deploying the radiator 51, the projector main unit 1 can be prevented from overheating during use while the radiator 51 is undeployed.

Sixth Modified Example

When the radiator 51 is drawn out of the casing 2, instead of using the radiator 51 to close the opening in the casing 2, a closing member can be provided for closing this opening.

Figure 15A:
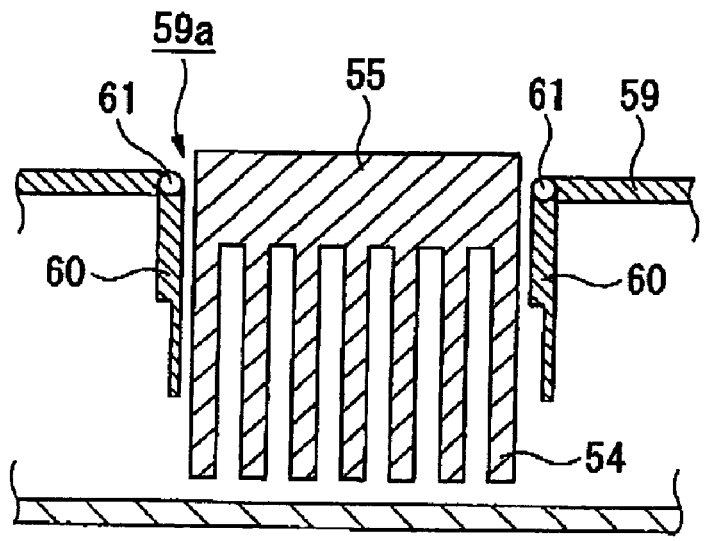
FIGS. 15A and 15B are cross-sectional views of an example of a closing member of a projector of a sixth modified example.
Figure 15B:
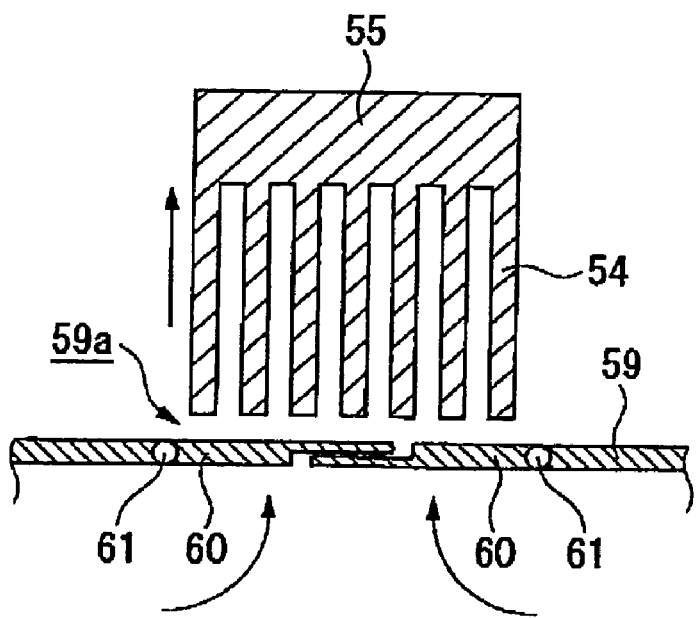
Figure 15B:

FIGS. 15A and 15B are cross-sectional views of the vicinity of an opening in the projector main unit 1.

As shown in FIGS. 15A and 15B, a light guide 59 for covering the optical path, and an opening 59a for inserting and retracting the heat sink 55 is provided in the light guide 59.

Two shutters 60 (closing members) are attached to ends of the opening 59a. Each shutter 60 is able to rotate around a hinge 61 so as to open and close the opening 59a (in a gatefold covered state).

Furthermore, a spring (not shown) is attached to each shutter 60, and applies a force in the direction that the shutter 60 closes in.

As shown in FIG. 15A, in a case in which the heat sink 55 is accommodated in the optical path, the heat sink 55 presses both shutters 60 downwards.

As shown in FIG. 15B, in a case in which the heat sink 55 is drawn out of the optical path, the springs are applying force to jump up, and the shutters 60 automatically close the opening 59a.

According to this configuration, it is possible to prevent infiltration of dust, dirt, and such like into the projector main unit during use.

While the user can close the opening 59a himself by operating the shutters 60 at the time of drawing the heat sink 55, it is more convenient if the shutters 60 close the opening 59a in conjunction with the drawing of the heat sink 55 to the outside of the casing, since this eliminates troublesome work for the user and avoids a problem of his forgetting to close the opening 59a.

Seventh Modified Example

Another example of the closing member will be described.

Figure 16A:
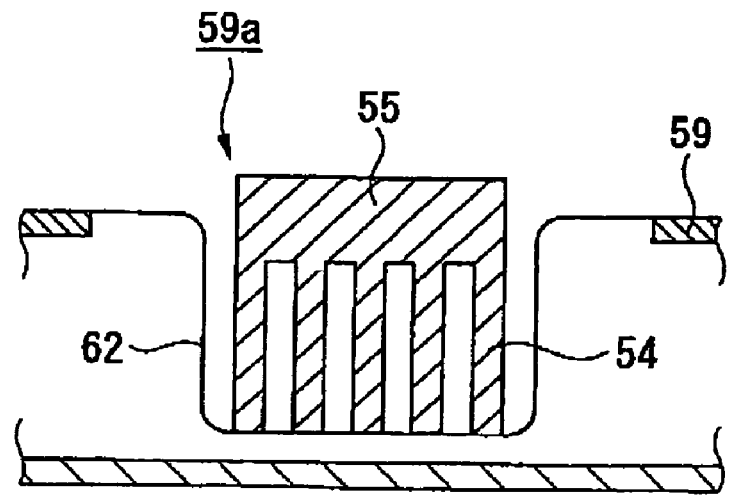
FIGS. 16A and 16B are cross-sectional views of an example of a closing member of a projector of a seventh modified example.
Figure 16B:
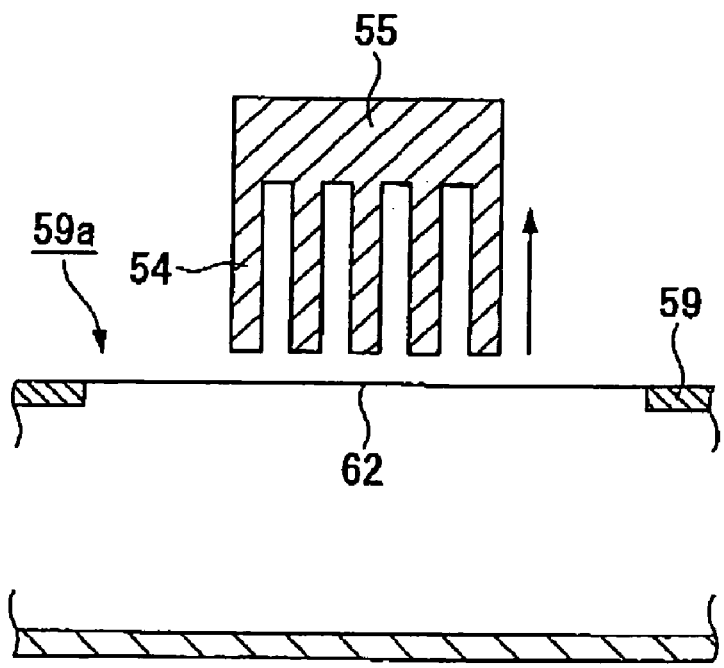

FIGS. 16A and 16B are cross-sectional views of a vicinity of an opening in the projector main unit 1.

As shown in FIGS. 16A and 16B, a light guide 59 for covering the optical path, and an opening 59a for inserting and retaining the heat sink 55 is provided in the light guide 59.

A light-blocking stretchable film 62 (closing member) is formed so as to cover the opening 59a.

As shown in FIG. 16A, in a case in which the heat sink 55 is accommodated in the optical path, the heat sink 55 presses against the film 62, the film 62 consequently expands and becomes wrapped around the heat sink 55 as it is accommodated in the casing 2.

On the other hand as shown in FIG. 16B, in a case in which the heat sink 55 is drawn out of the optical path, the pressure applied by the heat sink 55 is released, the expanded film 62 returns to its original state and becomes part of the side wall of the light guide 59, and the opening 59a is closed.

As described in the sixth modified example, this configuration is convenient in that it eliminates troublesome work for the user and avoids the problem of his forgetting to close the opening 59a.

In particular in this example, since the stretchable film is used as a member for closing the opening 59a, the mechanism for seating can be realized simply and inexpensively. Also, since the opening is completely closed, this configuration has excellent dust-resistance.

Eighth Modified Example

While this example describes a configuration in which the radiator is drawn above the projector main unit, this arrangement is not limitative, and the radiator can be drawn to the lower side of the projector main unit instead.

An example in which the radiator is drawn to the rear of the projector main unit will be explained with reference to FIGS. 17 and 18.

Figure 17:
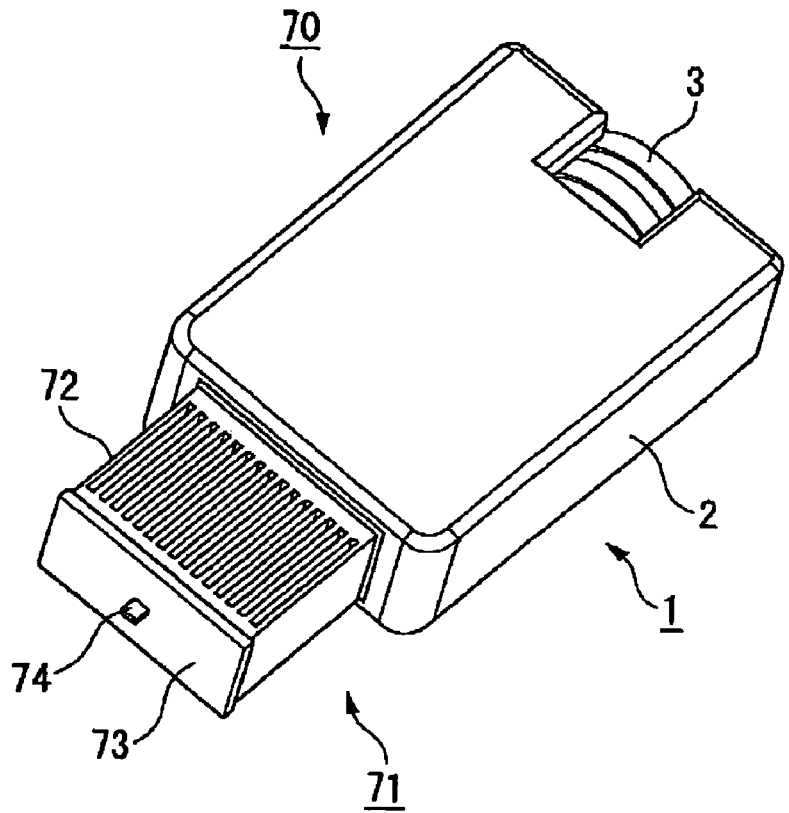
FIG. 17 is a perspective view of a deployed state of a radiator of a projector of an eight modified example.
Figure 18:
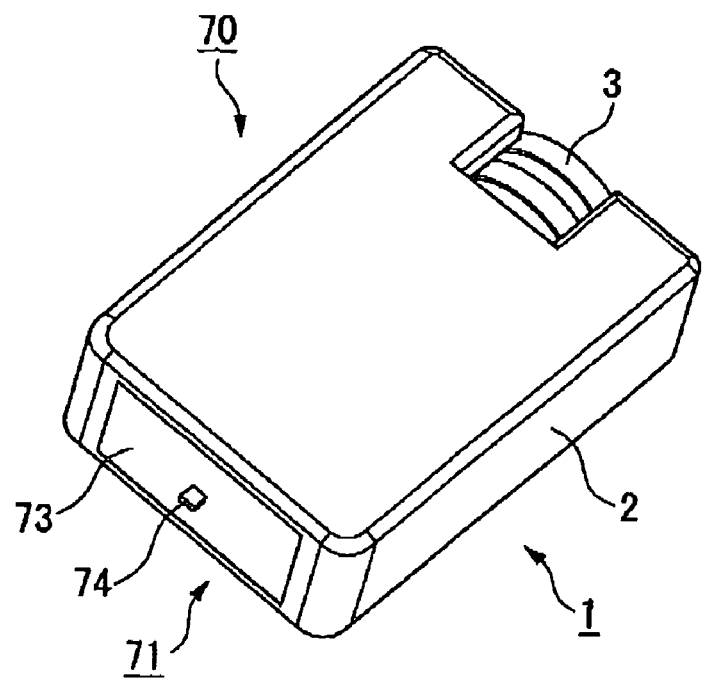
FIG. 18 is a perspective view of an accommodated state of the radiator of the same projector of the eight modified example.

FIG. 17 is a perspective view of a deployed state of a radiator of a projector of this example, and FIG. 18 is a perspective view of an accommodated state of the radiator of the same projector.

In FIGS. 17 and 18, constituent parts that are the same as those in FIGS. 1 to 3 are represented with the same reference numerals and are not repetitiously explained.

As shown in FIGS. 17 and 18, the projector of this example includes a projector main unit 1, and a radiator 71 which is accommodated in an internal space of the projector main unit 1 and can be deployed by drawing the radiator 71 to the rear of the projector main unit 1.

A slide rail (not shown) is provided inside the casing 2, and a heat sink 73 including a plurality of heat-radiating fins 72 is inserted so that the radiator 71 can move horizontally.

Spaces between adjacent heat-radiating fins 72 form openings penetrating through the heat sink 73 in its top-to-bottom direction.

As shown in FIG. 17, when the radiator 71 is in a drawn state, the opening in the casing 2 in which the heat sink 73 is inserted and retracted is closed by the heat sink 73.

While the heat sink 73 of this example is drawn manually by the user, the drawing of the heat sink 73 is facilitated by providing a handle 74 on a rear face of the heat sink 73 to enable the user to draw it.

In the projector 70 of this example, since the heat sink 73 of the radiator 71 can be accommodated in the internal space of the casing 2, the device can be miniaturized and thinner when not in use, and has excellent portability.

In particular in this example, since the radiator 71 is deployed to the rear, it is not affected by hot air rising above the projector main unit 1, it is possible to increase the heat radiation rate.

Furthermore, since the opening in the casing 2 is closed by the heat sink 73, the dust-resistance of the projector main unit 1 can be increased without needing to provide a separate closing member.

Third Embodiment

A third embodiment of the invention will be explained with reference to FIGS. 19 and 20.

Figure 19:
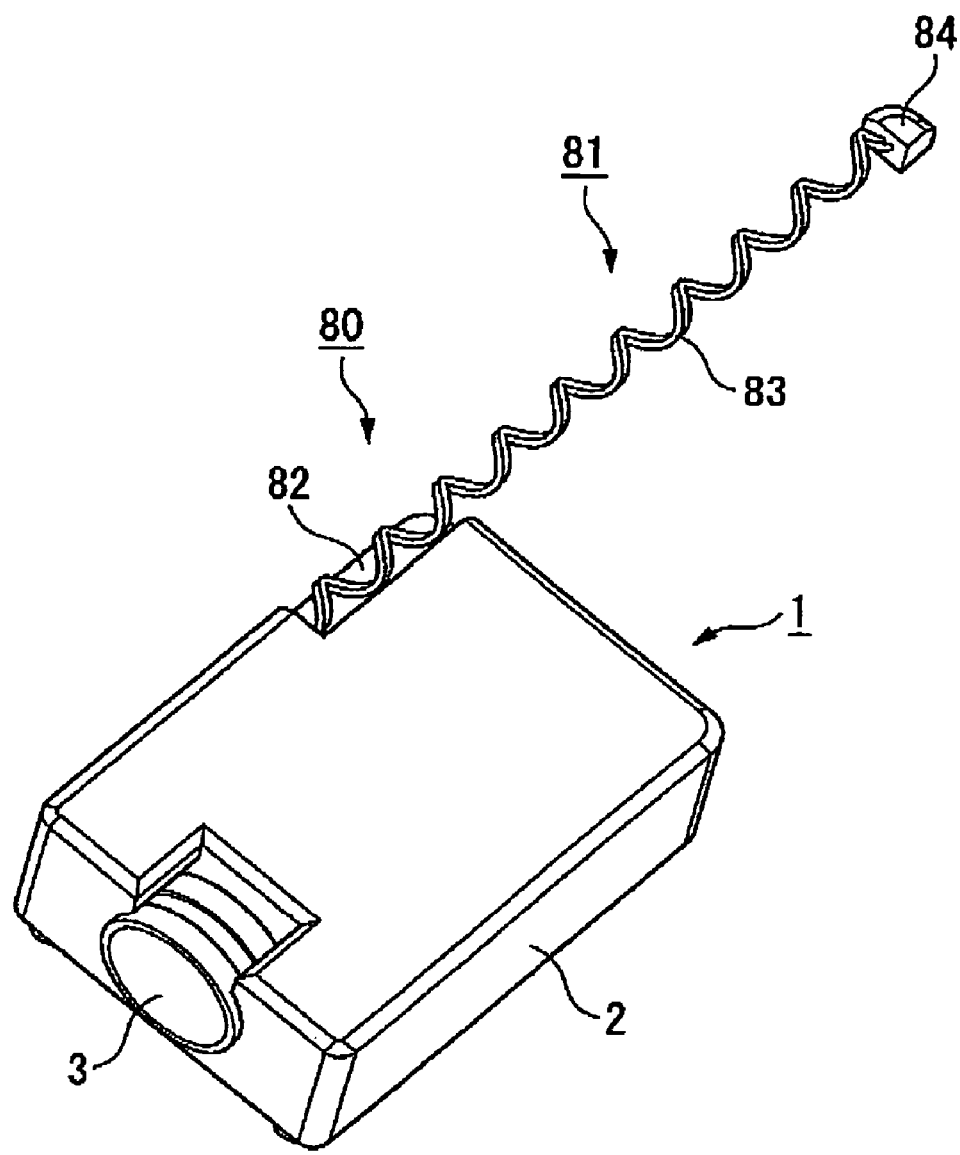
FIG. 19 is a perspective view of a deployed state of a radiator of a projector according to a third embodiment of the invention.
Figure 20:
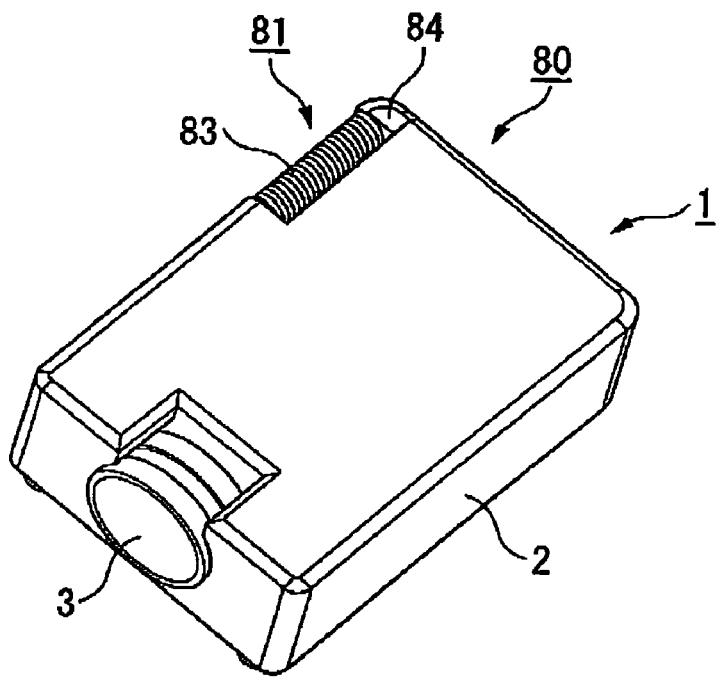
FIG. 20 is a perspective view of an accommodated state of the radiator of the projector of the third embodiment.

FIG. 19 is a perspective view of a deployed state of a radiator of a projector according to this embodiment, and FIG. 20 is a perspective view of an accommodated state of the radiator of the same projector.

In FIGS. 19 and 20, constituent parts that are the same as those in FIGS. 1 to 3 are represented with the same reference numerals and are not repetitiously explained.

As shown in FIGS. 19 and 20, a projector 80 of this embodiment includes a projector main unit 1 having a casing 2 and a projection lens 3, and a radiator 81 which is accommodated in a depression portion 82 provided in the casing 2 of the projector main unit 1 and can be deployed by drawing it out of the projector main unit 1.

The radiator 81 includes an expandable cooling pipe 83 (cooling medium flowpath) in which a cooling medium flows, and a heat-radiating member 84 that is provided to a tip of the cooling pipe 83.

The cooling pipe 83 includes a spiral-shaped resin pipe body including one each of an out of path (first cooling medium flowpath) and a return path (second cooling medium flowpath); as shown in FIG. 19, it is exposed to the outside from the center of one side of the long direction of the projector main unit 1, and can be expanded and contracted in the long direction of the projector main unit 1.

As shown in FIG. 20, the heat-radiating member 84 constitutes a corner that, when the cooling pipe 83 is contracted, constitutes part of the casing 2 and does not protrude from it.

The cooling pipe 83 can include a plurality of out of paths and a plurality of return paths.

In a case in which a plurality of the cooling pipes 83 is provided, the flow rate of the cooling medium can be increased and the heat radiation rate can be further increased.

As described in the first embodiment (FIG. 4), the cooling pipe 15 (cooling medium flowpath) is provided inside the casing 2 of the projector main unit 1, is arranged along the polarization conversion element 414 and three liquid crystal light valves 441R, 441G, and 441B, and is joined to the cooling pipe 83 which forms a part of the radiator 81.

By feeding the cooling medium into the cooling pipe 83 during use, heat generated by the projector main unit 1 is conveyed to the radiator 81 and radiated from the radiator 81.

The cooling pipe 83 can be expanded and contracted manually by the user, or automatically by an electrical operation.

In the latter case, configuration for automatically expanding and contracting the cooling pipe 83 can be realized by installing a motor in the projector main unit 1, and using a rack, pinions, and so on to convert motive power of the motor into linear motion.

As described in the above embodiments the radiator 81 can be deployed automatically by a radiator deploying section in conjunction with injection of power.

Moreover, when usage is attempted with the radiator 81 in the undeployed state, the configuration can include a power control unit for preventing injection of power, a warning section for issuing a warning to the user, etc.

These configurations can prevent the projector main unit 1 from overheating.

According to the projector 80 of this embodiment, since the cooling pipe 83 constituting a part of the radiator 81 can expand and contact, and can be accommodated in the depression portion 82 of the casing 2 when contracted, the device can be miniaturized and thinner when not in use, and has excellent portability.

In particular in this embodiment, since the out of and return paths of the cooling pipe 83 are arranged on one face side of the casing 2, the device can be installed compactly and does not occupy a large installation area when not in use.

Since the cooling pipe 83 can be deployed outside the casing 2 when it is expanded, the cooling medium can be cooled by outside air blowing against the cooling pipe 83. Therefore the heat radiation rate can be increased.

Ninth Modified Example

The power button 20 can be provided at a position on which the user fist becomes able to operate the power button 20 when the radiator 81 is drawn outside the casing 2.

Figure 21:
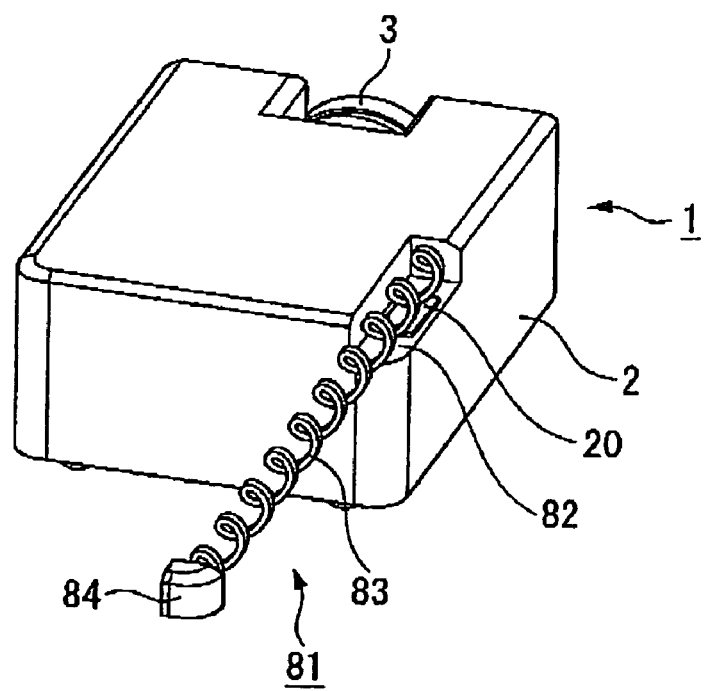
FIG. 21 is a perspective view of a deployed state of a radiator of a projector in a ninth modified example according to the third embodiment.

In the configuration shown in FIG. 21, the power button 20 is provided on the top face of the depression portion 82 in the casing 2. The depression portion 82 is exposed when the cooling pipe 83 is deployed.

In this example, the user deploys the cooling pipe 83 manually.

In this configuration, since the user cannot operate the power button 20 without first deploying the radiator 81, the projector main unit 1 can be prevented from overheating during use while the radiator 81 is not deployed.

Tenth Modified Example

While in the above embodiment, the out of and return paths of the cooling pipe aft both arranged on one face side of the casing, they can be separately arranged on two opposing faces of the casing.

Figure 22:
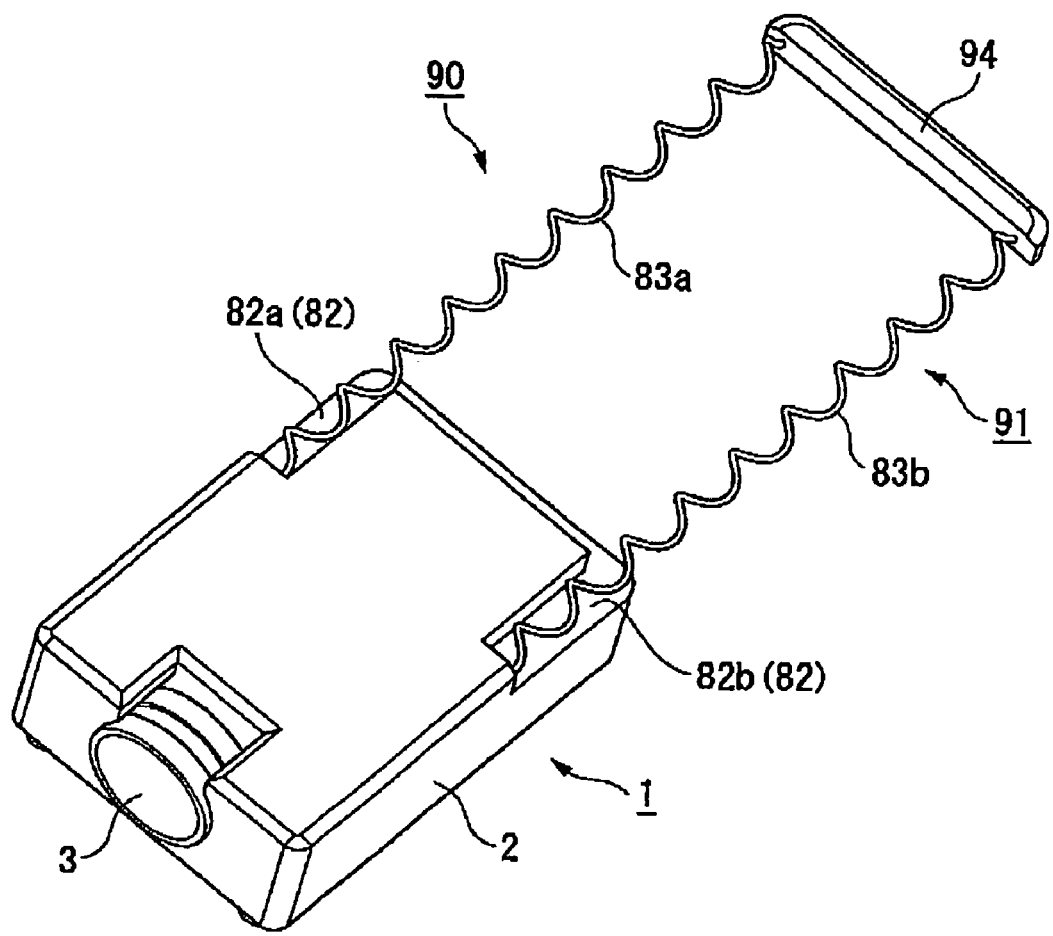
FIG. 22 is a perspective view of a deployed state of a radiator of a projector in a tenth modified example.
Figure 23:
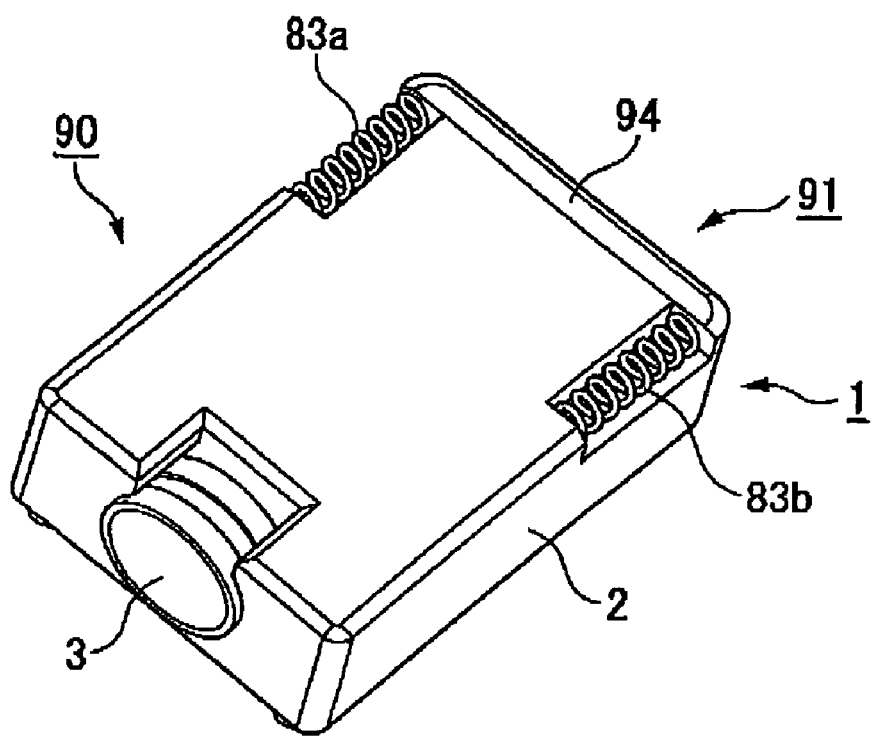
FIG. 23 is a perspective view of an accommodated state of a radiator of the same projector of the tenth modified example.

FIG. 22 is a perspective view of a deployed state of a radiator of a projector according to this example, and FIG. 23 is a perspective view of an accommodated state of a radiator of the same projector.

In FIGS. 22 and 23, constituent parts common to those of FIGS. 1 to 3 are represented by the same reference numerals and are not repetitiously explained.

As shown in FIGS. 22 and 23, a projector 90 of this example includes a projector main unit 1, and a radiator 91 which is accommodated in a depression portion 82 provided in a casing 2 of the projector main unit 1 and can be deployed by drawing it out of the projector main unit 1.

The radiator 91 includes expandable and contractible cooling pipes 83a and 83b (first cooling medium flowpaths and second cooling medium flowpaths) which a cooling medium flows along, and a heat-radiating member 94 that is provided midway along the cooling pipes 83a and 83b.

The cooling pipes 83a and 83b consist of spiral-shaped resin pipe bodies including one each of an out of path and a return path.

The cooling pipes 83a and 83b are exposed from centers of opposing faces of the casing 2 in its long direction, and, as shown in FIG. 22, expand and retract in the long direction of the projector main unit 1

As shown in FIG. 23, when the cooling pipes 83a and 83b are contracted, the heat-radiating member 94 constitutes part of a rear face side of the casing 2 and protrudes from the casing 2. In this case, the cooling pipes 83a is arranged on a first depression portion 82a (first portion), and the cooling pipes 83b is arranged on a second depression portion 82b (second portion).

The cooling pipes 83a and 83b may each include a plurality of out of paths and return paths.

When pluralities of these are provided, the flow rate of the cooling medium can be increased and the heat radiation rate can be further increased.

In this example, each of the cooling pipes 83a and 83b extending from two portions of the casing 2 has an out of path and a return path for the cooling medium.

The folding portions of the cooling pipes 83a and 83b penetrate through the inside of the heat-radiating member 94.

According to this configuration, the heat radiation area can be increased and the heat radiation rate can be further increased.

The technological scope of the invention is not limited to the above embodiments, and various modifications cam be made without departing from the spirit or scope of the present invention.

For example, while in the first embodiment, the radiator is arranged on the top face of the casing of the projector main unit, the radiator can be arranged on another face, such as a side face.

Instead of one radiator, a plurality of radiators can be provided.

Alternatively, a series of radiators connected by two or more hinges can be deployed two times or more.

Although this increases the complexity of the structure for accommodating the radiators, their areas can be increased.

In addition, the shape and arrangement of the radiator, the specific configurations of the deploying detection section, the warning section, radiator deploying section, illuminance controller, and so on, are not limited to the embodiments described above, and can be modified as appropriate.

What is claimed is:

1. A projector for use with a cooling medium, comprising:
a casing having a surface;
a radiator connected to the casing, the radiator being deployable by rotation away from the surface of the casing and adapted to be accommodated along the surface of the casing, the radiator including a plurality of first fins, the radiator defining openings provided between mutually adjacent first fins, and the openings penetrating through the radiator;
a cooling medium flowpath provided inside the casing and through which the cooling medium is allowed to flow, a part of the cooling medium flowpath being disposed in the radiator, and the cooling medium flowpath being at least partially exposed at the openings;
a hinge joining the casing to the radiator, the hinge allowing the radiator to rotate away from the surface of the casing; and
a plurality of second fins provided in the casing, the second fins of the casing being arranged between the mutually adjacent first fins and the second fins and the first fins fit each other when the radiator is accommodated along the surface of the casing.

2. The projector according to claim 1, further comprising:
a deployment detector detecting whether the radiator is deployed; and
a power control unit prohibiting supply of power to the projector when the deployment detector detects that the radiator is not deployed.

3. The projector according to claim 1, further comprising:
a deployment detector detecting whether the radiator is deployed; and
a warning section issuing a warning indicating that the radiator is not deployed when the deployment detector detects that the radiator is not deployed.

4. The projector according to claim 1, further comprising:
a light source arranged inside the casing;
a deployment detector detecting whether the radiator is deployed; and
an illuminance controller reducing the illuminance of light at the light source when the deployment detector detects that the radiator is not deployed.

5. The projector according to claim 1, further comprising:
a radiator deploying section automatically deploying the radiator in conjunction with supply of power to the projector.

6. The projector according to claim 1, further comprising:
a power input section exposed when the radiator is deployed.

7. A projector for use with a cooling medium, comprising:
a casing having a top plate;
a radiator connected to the top plate;
a cooling medium flowpath provided inside the casing, through which the cooling medium flows, a part of the cooling medium flowpath being disposed in the radiator, the radiator being deployable by drawing the radiator out of the casing, and being adapted to be accommodated in the casing;
slide rails allowing the top plate of the casing to elevate and lower, the slide rails allowing the top plate to be drawn out to deploy the radiator; and
accordion-folded flexible tubes forming a part of the cooling medium flowpath and being provided between the cooling medium flowpath inside the casing and the top plate.

8. The projector according to claim 7, wherein
the casing internally includes an optical path space, and the radiator is accommodated in the optical path space.

9. The projector according to claim 7, wherein
the casing defines an opening, and a part of the radiator closes the opening in the casing when the radiator is drawn out of the casing.

10. The projector according to claim 7, wherein
the casing defines an opening, the projector further comprising a closing member closing the opening of the casing when the radiator is drawn out of the casing.

11. The projector according to claim 10, wherein
the closing member closes the opening in the casing in conjunction with an operation of drawing the radiator out of the casing.

12. The projector according to claim 7, further comprising:
a deployment detector detecting whether the radiator is deployed; and
a power control unit prohibiting supply of power to the projector when the deployment detector detects that the radiator is not deployed.

13. The projector according to claim 7, further comprising:
a deployment detector detecting whether the radiator is deployed; and
a warning section issuing a warning indicating that the radiator is not deployed when the deployment detector detects that the radiator is not deployed.

14. The projector according to claim 7, further comprising:
a light source arranged inside the casing;
a deployment detector detecting whether the radiator is deployed; and
an illuminance controller reducing the illuminance of light at the light source when the deployment detector detects that the radiator is not deployed.

15. The projector according to claim 7, further comprising:
a radiator deploying section automatically deploying the radiator in conjunction with supply of power to the projector.

16. The projector according to claim 7, further comprising:
a power input section exposed when the radiator is deployed.

17. A projector for use with a cooling medium, comprising:
a casing defining a depressed portion;
a radiator;
a cooling medium flowpath provided inside the casing and through which the cooling medium flows, a part of the cooling medium flowpath being disposed in the radiator, wherein
the part of the cooling medium flowpath is a spiral-shaped pipe that is expandable and contractible in a long direction of the casing, the part being accommodated within the depressed portion of the casing when contracted in the long direction of the casing, and the part being deployed away from the casing when expanded in the long direction of the casing.

18. The projector according to claim 17, further comprising:
a plurality of the cooling medium flowpaths.

19. The projector according to claim 17, further comprising:
a heat-radiating member provided in the cooling medium flowpath, and constituting a part of the casing when the cooling medium flowpath is contracted.

20. The projector according to claim 17, wherein
the cooling medium flowpath includes a first cooling medium flowpath in which the cooling medium flows away from the casing and a second cooling medium flowpath in which the cooling medium flows toward the casing, and the first cooling medium flowpath and the second cooling medium flowpath being disposed in one portion of the casing.

21. The projector according to claim 17, wherein
the casing includes a first portion and a second portion which is different than the first portion, the cooling medium flowpath including a first cooling medium flowpath in which the cooling medium flows away from the casing and a second cooling medium flowpath in which the cooling medium flows toward the casing, the first cooling medium flowpath being arranged in the first portion of the casing, and the second cooling medium flowpath being arranged in the second portion of the casing.

22. The projector according to claim 17, further comprising:
a deployment detector detecting whether the radiator is deployed; and
a power control unit prohibiting supply of power to the projector when the deployment detector detects that the radiator is not deployed.

23. The projector according to claim 17, further comprising:
a deployment detector detecting whether the radiator is deployed; and
a warning section issuing a warning indicating that the radiator is not deployed when the deployment detector detects that the radiator is not deployed.

24. The projector according to claim 17, further comprising:
a light source arranged inside the casing;
a deployment detector detecting whether the radiator is deployed; and
an illuminance controller reducing the illuminance of light at the light source when the deployment detector detects that the radiator is not deployed.

25. The projector according to claim 17, further comprising:
a radiator deploying section automatically deploying the radiator in conjunction with supply of power to the projector.

26. The projector according to claim 17, further comprising:
a power input section exposed when the radiator is deployed.

27. The projector according to claim 7, further comprising:
a cooling pipe disposed in the top plate; and
an accordion-folded flexible tube forming a part of the cooling medium flowpath, the accordion-folded flexible tube being provided between the casing and the top plate so as to join the cooling medium flowpath in the casing to the cooling pipe in the top plate, the accordion-folded flexible tube expanding and contracting when the slide rails allow the top plate of the casing to elevate and lower.

* * * * *